United States Patent [19]

Pfaff

[11] Patent Number: 5,010,542
[45] Date of Patent: Apr. 23, 1991

[54] MULTI-STAGE SWITCHING NETWORK FOR LIGHT WAVEGUIDES

[75] Inventor: Juergen Pfaff, Munich, Fed. Rep. of Germany

[73] Assignee: Siemens Aktiengesellschaft, Munich, Fed. Rep. of Germany

[21] Appl. No.: 232,504

[22] Filed: Aug. 15, 1988

[30] Foreign Application Priority Data

Aug. 20, 1987 [DE] Fed. Rep. of Germany ....... 3727827

[51] Int. Cl.$^5$ ............................................ H04J 14/00
[52] U.S. Cl. ....................................... 370/1; 455/600
[58] Field of Search .................. 455/600, 601–607; 320/1, 3, 4, 58, 60; 340/825.02; 350/96.14

[56] References Cited

U.S. PATENT DOCUMENTS

| | | | |
|---|---|---|---|
| 3,980,831 | 9/1976 | Mertel | 179/1 B |
| 4,011,543 | 3/1977 | Soref | 455/612 |
| 4,351,985 | 9/1982 | Schlichte et al. | 340/325.8 |
| 4,731,878 | 3/1988 | Vaidya | 320/1 |
| 4,787,692 | 11/1988 | Spanke | 350/96.14 |
| 4,807,280 | 2/1989 | Posner | 379/272 |

FOREIGN PATENT DOCUMENTS

| | | |
|---|---|---|
| 0146275 | 6/1985 | European Pat. Off. |
| 582206 | 7/1933 | Fed. Rep. of Germany |
| 1115775 | 2/1964 | Fed. Rep. of Germany |
| 2036176 | 8/1972 | Fed. Rep. of Germany |
| 3025083 | 1/1981 | Fed. Rep. of Germany |
| 3025083 | 1/1982 | Fed. Rep. of Germany |
| 3230251 | 1/1984 | Fed. Rep. of Germany |
| 3235266 | 3/1984 | Fed. Rep. of Germany |
| 3423221 | 11/1984 | Fed. Rep. of Germany |
| 3626060 | 2/1987 | Fed. Rep. of Germany |

OTHER PUBLICATIONS

Opto-Electronic Exchange of the Future by Blackmore, Stewart and Gennion, ISS 84 Florence, 7–11, May 1984.
Electronics Week Entitled "Switches Take to Optics", Mar. 18, 1985.
PCT Application WO 87/04886.

*Primary Examiner*—Reinhard J. Eisenzopf
*Assistant Examiner*—L. Van Bek
*Attorney, Agent, or Firm*—Hill, Van Santen, Steadman & Simpson

[57] ABSTRACT

A multi-stage switching network in which a plurality of optical binary couplers are symmetrically connected to each other relative to the center line of the switching network and pyramids of the optical binary couplers individually associated to switching network terminals are provided, and every optical binary coupler in said pyramids is unconnected at one of its two light-conducting paths on that side which faces away from the center line of the switching network, and across the center line of the switching network, every binary coupler pyramid is connected in a light-conducting manner to every binary coupler pyramid lying at the other side such that every switching network through-connect path outgoing from a switching network terminal or, respectively, leading to a switching network terminal contains an unconnected light-conducting path of an optical binary coupler when all binary couplers are in the crossed through-connect condition. Controllable electro-optical directional couplers can be used as the optical binary couplers. The unconnected light-conducting path can be terminated with a light absorber.

4 Claims, 1 Drawing Sheet

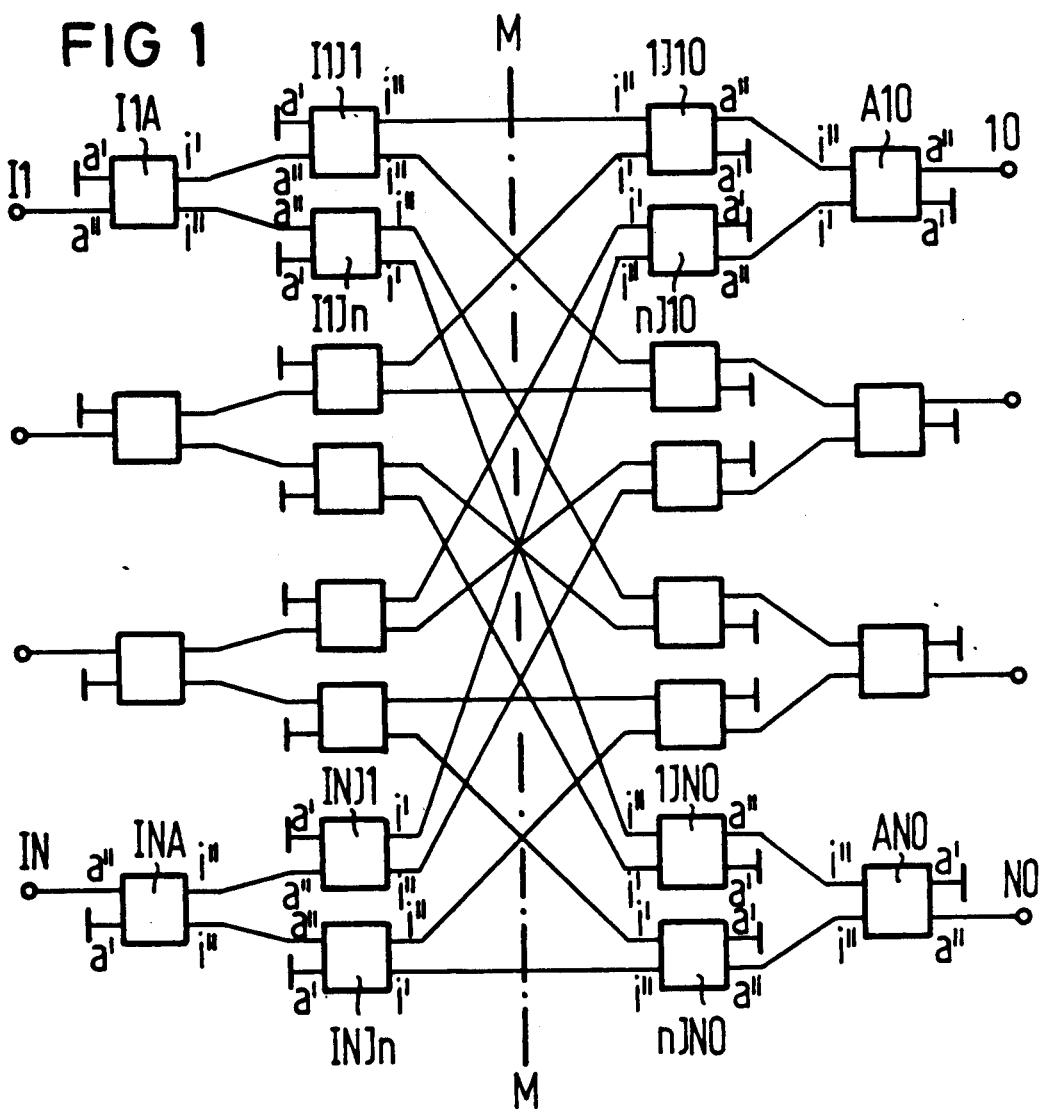
FIG 1
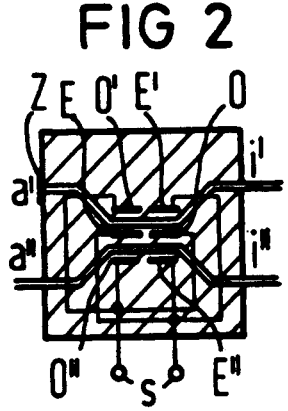
FIG 2
FIG 3  FIG 4
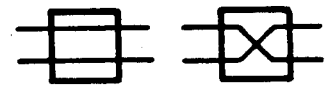
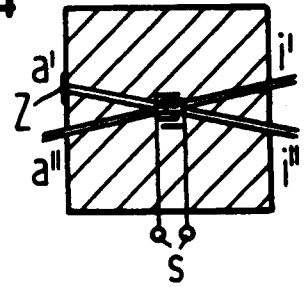
FIG 5

MULTI-STAGE SWITCHING NETWORK FOR LIGHT WAVEGUIDES

BACKGROUND OF THE INVENTION

1. Field of the Invention

This invention relates in general to switching systems for light waveguides and in particular to a novel switching system which prevents undesired connections when voltage outages occur in a switching matrix network formed from optical binary couplers.

2. Description of the Related Art

Recent developments in telecommunications technology have resulted in light waveguide (LWG) communication system in which not only the subscriber lines extending between the exchange and the subscriber stations are formed by light waveguides as disclosed in U.S. Pat. No. 39 80 831 German Pat. No. 2 421 002), but also the through-connections in the exchange can be produced using light guiding integrated optics (IO) 2×2 switch elements for example, in the form of controllable electro-optical directional couplers as described in the paper ISS'84 Conference Papers 41A4, FIGS. 3, 5, 6 and 8; and 1986 International Zurich Seminar Conference Papers C7, FIGS. 1, 2 and 4.

In a controllable electro-optical directional coupler, two strip waveguides which are narrow thin strips produced in a substrate by driving in, for example, titanium into lithium niobate and which have a higher optical refractive index than the substrate are formed in extremely close proximity to each other at a typical distance of about 5μm in a coupling region of a defined length so that the optical fields overlap and light energy can be coupled from one strip waveguide onto the other strip waveguide. Control electrodes which receive an electrical control signal which influences the cross-over are located in the coupling region next to and/or between the strip waveguides and when an adequate corresponding control voltage exists, no crossover occurs. In the absence of a control voltage, a complete crossover can occur as is discussed in the article ntz 39(1986) 12, Pages 828...830 and FIGS. 3c and 3d; Telcom Report 10(1987) 2, Pages 90...98, FIG. 8.

Since 2×2 switching elements which are only capable of two switching conditions which are uncrossed through-connection and the cross through-connection are also referred to as binary couplers as shown in U.S. Pat. No. 43 51 985 (German Pat. No. 2 036 176), (in communication technology) controllable electro-optical directional couplers utilized as 2×2 switching elements can also be referred to as optical binary couplers.

Larger switching networks can also be formed with binary couplers as shown in U.S. Pat. No. 43 51 985 (German Pat. No. 2 036 176); ISS'84 Conference Papers, Loc. Cit., 1986 International Zurich Seminar Conference Papers Loc. Cit.; and, for example, an optical 4×4 switching network can be realized with at least five optical binary couplers contained in an integrated optics IO module and arranged in three stages as shown in the publication Electronics Week, March 18, 1985, Pages 55...58, FIG. 7.

The fact that when using switching networks formed with binary couplers, the individual binary couplers are always in one or the other through condition in a switching matrix network formed with optical binary couplers all binary couplers are in the condition of cross through-connection in the absence of all control voltages as, for example, due to the outage of the supply results in a problem when it is desired to avoid any undesired connections.

A list of art which can serve as background for the present invention comprises European Patent Application No. 0 146 275, the article High Speed Wide Band Digital Switching and Communication Utilizing Guided Waveguides by Lars Thylen, Pages 113 through 116. ISS'84 Florence 7-11, May 1984, Session 41a Paper, Pages 1-7, Electronics Week, March 18, 1985, Pages 55-57, German Patent No. 2 036 176, German DE 30 25 083, German Patent 582,206, German 1 115 775; publication Forschung-Entwicklung ntz Bd 39 (1986), Pages 828-830, Telcom Report 10 1987, Trends Pages 90-98, German DE 30 25 083, German DE 32 30 251, German DE 32 35 266, German DE 34 23 221, German 36 26 060.

SUMMARY OF THE INVENTION

It is an object of the present invention to provide a switching matrix network wherein a switching matrix network terminal is not connected to any other switching matrix network upon a power outage.

The present invention is directed to a multi-stage switching network which comprises a plurality of optical binary couplers connected to each other symmetrically relative to the center line of the switching network and the switching network is inventively characterized in that every switching network terminal forms the tip of a pyramid of optical binary couplers that respectively end before the center line of the switching network and are individually associated with a switching network terminal. Every optical binary coupler in the pyramid is unconnected in one of its two light conducting paths at the side facing away from the center line of the switching network and the pyramid is connected in light conducting fashion across the center line of the switching network to every binary coupler pyramid lying at the other side of the center line in a fashion such that every switching network through-connected path outgoing from the switching network or leading to a switching network contains an unconnected light conducting path of an optical binary coupler when cross-through-connections of all binary couplers occurs.

It should be noted that relay switch-over contact pyramids such as shown in German Pat. No. 582,206 or German Pat. No. 1,115,775 which are hereby incorporated by reference and other switching network structures disclosed, for example, in European Patent Application No. 0 146 275 which is hereby incorporated by reference are formed with simple switch-overs are known. These, however, do not relate to the problem of avoiding unnecessary and undesired connections when voltage outage occurs in a switching network formed with optical binary couplers and the invention solves such problem.

The invention produces the advantage of being able to avoid undesired connections of terminals of a switching network formed with optical binary couplers when an outage of the control voltage for the binary couplers occurs.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a block diagram illustrating an exemplary embodiment of a switching network of the invention;

FIG. 2 is a top plan view illustrating an optical binary coupler in the form of controllable electro-optical directional coupler;

FIG. 3 illustrates the through-connection of the optical binary coupler;

FIG. 4 illustrates the cross-over connection of an optical binary coupler; and

FIG. 5 illustrates an optical binary coupler in the form of a Bragg reflector.

DESCRIPTION OF THE PREFERRED EMBODIMENTS

FIG. 1 is a block diagram illustrating an exemplary embodiment of a multi-stage switching network according to the invention. The multi-stage switching network is formed with a plurality of optical binary couplers I1A,...INA; I1J1,...INJn; IJ10,...nJN0; and A10,....AN0 which are connected to each other in steps which are symmetrically arranged relative to a center line M—M of the switching network. These binary couplers are grouped to form pyramids individually associated to switching network terminals and the apexes of the pyramids are formed by the respective switching network terminal and the base of the pyramids are adjacent the center line M—M of the switching network. Thus, for example, the input terminals I1-IN on the left of FIG. 1 provide inputs to the a" inputs of the optical binary couplers I1A...INA. A second group of optical binary couplers I1J1 and I1Jn through INJ1 and INJn receive the outputs of the optical binary couplers I1A through INA as shown in FIG. 1. These directional couplers are to the left of the center line M—M in FIG. 1 and have their outputs connected to optical binary couplers on the right of the center line M—M such as the optical binary couplers, iJ10 and nJ10 through iJN0 and nJN0 as shown in FIG. 1. Optical binary couplers A10 through AN0 receive the outputs of the optical binary couplers IJ10, nJ10 through IJN0 and nJN0 and have output terminals a" connected to the output terminals 10-N0 as shown.

Optical binary couplers are known per se in the form of controllable electro-optical directional couplers as listed in the references given above and they are capable of only two switch conditions. One is the condition of uncrossed through-condition as shown in FIG. 3 and the other condition is a crossed-through-connect as indicated in FIG. 4.

FIG. 2 schematically illustrates an optical binary coupler formed with a controllable electro-optical directional coupler wherein two strip waveguides a'–i' and a"–i" are formed in a substrate by, for example, driving in lithium niobate and in the actual coupling region comprising a defined length the two strip waveguides extend side-by-side in close proximity at a spacing of typically about 5μm so that light energy can be coupled from one strip waveguide to the other strip waveguide. Control electrodes E, E', E" and 0, 0' and 0" are located in the coupling regions and these control electrodes can be supplied with an appropriate electrical control voltage from control signal terminals s to supply a voltage that assures that no cross-over occurs. The binary coupler is then in the condition of uncrossed through-connect in which, for example, light entering into the light conducting path a" emerges from the light conducting path i". Such an optical binary coupler is in the condition of a crossed through-connect when light entering into the light conducting paths a" emerges from the light conducting path i' which occurs when the control voltage is absent due to, for example, an outage of the supply voltage.

Accordingly as shown in FIG. 1, the switching network terminal IN is connected in light conducting fashion to the switching network terminal 10 in case of for example, an uncrossed through-connect of the two binary couplers INA and nJ10 and a crossed through-connect of the two binary couplers INJ1 and A10. The switching matrix network terminal I1 is connected in light conducting fashion to the switching network terminal N0 when, for example, an uncrossed through-connect of the two binary couplers I1A and 1JN0 and a cross through-connect of the two binary couplers I1Jn and AN0 occurs.

When all control voltages disappear as, for example, due to an outage of the supply voltage, all binary couplers of the switching network illustrated in FIG. 1 are in their condition of crossed through-connect. So as to assure that no switching network terminal is connected to another switching network terminal, every optical binary coupler of the individual pyramids of optical binary couplers individually associated to the switching network terminals is unconnected in one of its two light conducting paths at that side which faces away from the center line M—M of the switching network. Across the center line M—M of the switching network, the binary coupler pyramids are connected in light conducting fashion to every binary coupler pyramid lying at the other side such that every switching network through-connect path outgoing from the switching network terminal or, respectively, leading to a switching network terminal contains such an unconnected light conducting path of an optical binary coupler when cross through-connect of all binary couplers occurs. In FIG. 1 and in FIG. 2, the respective unconnected light conducting path of the optical binary couplers is indicated by reference a'. So as to avoid disturbing reflections in the unconnected light conducting path a', such path can be terminated with a light absorber that completely absorbs the light impinging on it from the light conducting paths a'. Such a light absorbing layer is referenzed by z as shown in FIG. 2.

When a voltage outage occurs, all optical couplers are switched into the condition of cross through-connect and then with the switching network illustrated in FIG. 1, a connection outgoing, for example, from the switching network terminal I1 is conducted by way of the binary couplers I1A, I1J1 and IJ10 which are respectively through-connecting in cross-fashion to the unconnected light conducting path a' of the binary coupler IJ10 and, thus, the light ends at such point. In a similar manner, all other switching network terminals IN; 10,...N0 are also connected to the unconnected light conducting path a' of such a binary coupler by way of two or three optical binary couplers which are through-connected in a crossed manner and all such light paths end in an unconnected terminal a'.

The switching network illustrated in FIG. 1 is a four stage 4×4 switching network comprising two stage binary coupler pyramids individually associated to a switching network terminal. The invention however is not limited to such configuration and it can be quite generally employed in 2n stage N×N switching networks having n-stage binary coupler pyramids individually associated to the switching network terminals where n =lbN. The invention is not limited to the realization of the binary couplers comprising controllable opto-directional electrical directional couplers illustrated in FIG. 2 but also relate to other types of binary couplers for example, such as Bragg reflectors as schematically illustrated in FIG. 5. In FIG. 5, two strip waveguides a'-i" and a"-i' cross at twice the Bragg angle and are formed by driving in titanium into an electro-optical crystal of for example, lithium niobate. A finger-shape electrode structure which can be charged with a corresponding electrical control voltage supplied at control terminals s is provided in the crossing region of the strip waveguides. A refractive index grating can be produced with such a control voltage on the basis of the electro-optical effect in the crossing region and light incident at the Bragg angle is deflected at the refractive index grating so that the incident light and the deflected light describes twice the Bragg angle as described in DE A 3 025 083 FIG. 1 and the binary coupler of FIG. 5 is then in its condition of uncrossed through-connect in which, for example, light entering into the light conducting path a" emerges from the light conducting path i".

Such deflection of the light does not occur on the absence of the control voltage and the binary couplers is then in its condition of cross through-connect in which, for example, light entering into the light conducting paths a', emerges from the light conducting path i'.

The light conducting path of the binary optical coupler which is disconnected in FIG. 5 and referenced a' can be terminated with a light absorbing layer Z as shown in FIG. 2.

Although the invention has been described with respect to preferred embodiments, it is not to be so limited as changes and modifications can be made therein which are within the full intended scope as defined by the appended claims.

I claim as my invention:

1. A multi-stage switching matrix network with a plurality of optical binary couplers which include a plurality of terminals and which can be switched to a direct path condition by switching signals and which will be in a crossed through connected condition when no switching signal is present, and which has terminals for the switching matrix network (I1,. . ., IN; 10,. . ., NO) constitutes the tope of a pyramid of optical binary couplers (IA1,I1J1,I1Jn;. . .;nJNO, 1JNO,ANO) said pyramid being provided individually for each of said terminals of the switching matrix network and respectively ending before a cneterline (M—M) of the switching matrix network, in which each optical binary coupler (IA1, I1J1, I1Jn;. . .;nJNO, 1JNO,ANO) has a terminal which is unconnected in one of its two light conducting path (a') on the side not facing a centerline (M—M) of the switching matrix network and which is connected in a light conducting manner beyond the centerline (M—M) of the switching matrix network with every binary coupler pyramid (1J10,nJ10,A10;. . . 1JNO,nJNO,ANO;I1J1,I1A;. . .;INJ1, INJn, INA) located on the other side, characterized in that, the individual optical binary couplers are connected in a light conducting fashion with the respective binary coupler pyramid (1J10, nJ10, A10; . . .;1JNO, nJNO,ANO; I1J1, I1Jn, I1A;. . .;INJ1, INJn, INA) and beyond the centerline of the switching matrix network such that every switching path of the switching matrix network originating from a switching matrix network terminal (I1,. . .IN) or leading to a switching matrix network terminal (10,. . .NO) contains a terminal which is unconnected (a') of an optical binary coupler so that if there are no switching signals present a connection will not exist between an input and an output of said switching matrix and the incoming signal is always switched to one of said unconnected terminals unless a switching signal is present.

2. A switching network according to claim 1, characterized in that the unconnected light-conducting path (a') is terminated with a light absorber (Z).

3. A multi-stage switching network comprising, a plurality of optical binary couplers which include a plurality of terminals and which can be switched to a direct path by switching signals and will be in a crossed through connected condition when no switching signal is present, and which are symmetrically connected to each other relative to the center line of said switching network, characterized in that a switching network terminal (I1,. . .IN; 10,. . .NO0 forms the apex of a pyramid of optical binary couplers (Ia1, I1J1, I1Jn;. . .;nJNO, IJNo, ANO) which is individually associated to a switching network terminal and respectively ends before a center line (M—M) of the switching network, every optical binary coupler (IA1, I1J1, I1Jn;. . .;nJNO, ANO) in said pyramid having a terminal which is unconnected at the side which faces away from the center line (M—M) of said switching matrix network, and said pyramid connected in light-conducting manner across the center line (M—M) of said switching matrix network to every binary coupler pyramid (1J10, nJ10, A10;. . .1JN), nJNO, ANO; I1j1, I1Jn, I1A;. . .;INJ1, INJn, INA) which lies at the other side of said center line such that every switching network through-connect path outgoing from a switching network terminal (I1,. . .,IN) or, respectively, leading to a switching network terminal (10,. . .NO) contains an unconnected light-conducting path (a') of an optical binary coupler and the output will not be connected to the input when all of said binary couplers (I1A,. . .,ANO) are in the crossed through-connected condition and an incoming signal will not be connected to the output unless a switching signal is present.

4. A switching network according to claim 3, characterized in that the unconnected light-conducting path (a') is terminated with a light absorber (Z).

* * * * *